(12) United States Patent
Kim et al.

(10) Patent No.: US 10,328,791 B2
(45) Date of Patent: Jun. 25, 2019

(54) DUAL CAP ASSEMBLY HAVING MULTIPLE PASSAGES

(71) Applicants: Hyundai Motor Company, Seoul (KR); Kia Motors Corporation, Seoul (KR)

(72) Inventors: Ju Tae Kim, Hwaseong-si (KR); Hae Hoon Lee, Hwaseong-si (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 65 days.

(21) Appl. No.: 15/804,914

(22) Filed: Nov. 6, 2017

(65) Prior Publication Data

US 2018/0334027 A1 Nov. 22, 2018

(30) Foreign Application Priority Data

May 18, 2017 (KR) .......................... 10-2017-0061467

(51) Int. Cl.
*B60K 15/04* (2006.01)

(52) U.S. Cl.
CPC .. *B60K 15/0406* (2013.01); *B60K 2015/0477* (2013.01); *Y10T 137/60* (2015.04)

(58) Field of Classification Search
CPC .............. Y10T 137/60; B60K 15/0406; B60K 2015/0477
USPC ............ 141/350, 100; 220/86.1, 86.2, 254.1, 220/254.8, 255
See application file for complete search history.

(56) References Cited

U.S. PATENT DOCUMENTS

| | | | | |
|---|---|---|---|---|
| 5,423,447 A | * | 6/1995 | Youngs | E02D 29/12 215/47 |
| 6,374,868 B1 | * | 4/2002 | Channing | B60K 15/04 141/100 |
| 7,578,321 B2 | * | 8/2009 | Levin | F01N 3/2066 141/55 |
| 9,879,829 B2 | * | 1/2018 | Delihas | B60K 15/03 |
| 2015/0290586 A1 | * | 10/2015 | Ham | B01D 19/0073 422/106 |
| 2017/0355589 A1 | * | 12/2017 | Kim | B67D 7/3245 |

FOREIGN PATENT DOCUMENTS

KR 10-2005-0040052 A 5/2005

* cited by examiner

*Primary Examiner* — Eric Keasel
*Assistant Examiner* — Kevin R Barss
(74) *Attorney, Agent, or Firm* — Morgan, Lewis & Bockius LLP

(57) ABSTRACT

A dual cap assembly having multiple passages, may include a pipe device having a plurality of separate passages; a first cap device detachably mounted at a position where the passages diverge in the pipe device to close a first passage; and a second cap device detachably mounted on the first cap device to close a second passage, wherein when the first cap device is separated from the pipe device, the first passage is opened, and when the second cap device is separated with the first cap device mounted on the pipe device, the second passage is opened while the first passage is closed.

26 Claims, 11 Drawing Sheets

DUAL CAP ASSEMBLY HAVING MULTIPLE PASSAGES

CROSS-REFERENCE(S) TO RELATED APPLICATIONS

The present application claims priority to Korean Patent Application No. 10-2017-0061467, filed on May 18, 2017, the entire contents of which is incorporated herein for all purposes by this reference.

BACKGROUND OF THE INVENTION

Field of the Invention

The present invention relates to a dual cap assembly having multiple passages, and, more particularly, to a dual cap assembly having multiple passages configured to unify separate passages and open or close the unified passages.

Description of Related Art

In general, vehicles have a fuel tank for keeping fuel, and a diesel engine is further disposed with a selective catalytic reduction (SCR) system configured for producing ammonia using urea, thus a urea tank for keeping urea is provided.

Since a fuel tank and a urea tank are separated, a fuel inlet and a urea inlet are separated. Since a fuel inlet and a urea inlet are formed at different positions, separate caps are required for each inlet, separate mountings are required to dispose the fuel inlet and the urea inlet, and there is a need for a wide region for the fuel inlet and the urea inlet to be disposed.

Furthermore, since the fuel inlet and the urea inlet are provided separately, a hermetic sealing ability of the apparatus is reduced due to the wide disposition region, a design quality deteriorates, and the manufacturing cost is increased.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing a dual cap assembly having multiple passages configured to unify a fuel injection passage and a urea injection passage and selectively open or close the fuel injection passage and the urea injection passage, reducing a disposition region for the passages, improving the design quality, and reducing the manufacturing cost.

The dual cap assembly having multiple passages According to various aspects of the present invention may include a pipe device having a plurality of separate passages; a first cap device detachably mounted at a position where the passages diverge in the pipe device configured to close a first passage; and a second cap device detachably mounted on the first cap device configured to close a second passage, wherein when the first cap device is separated from the pipe device the first passage is opened, and when the second cap device is separated with the first cap device mounted on the pipe device the second passage is opened with the first passage closed.

The pipe device may have a fuel injection passage for keeping fuel and a urea injection passage for keeping urea, and the cap assembly may further include a guide pipe disposed at an inlet of the fuel injection passage and connected to the urea injection passage, separating the fuel injection passage and the urea injection passage.

The guide pipe may have a fixing portion surrounding the inlet of the fuel injection passage, and a circumferential portion formed wider than the fixing portion, forming a channel with the fixing portion which is connected to the urea injection passage and having an open side.

In the guide portion, the circumferential portion may extend to a greater height than the fixing portion.

A block diaphragm configured to elastically turn toward the fixing portion to come in contact with the fixing portion may be disposed on the circumferential portion.

A plurality of block diaphragms may be provided and separated from each other around an internal side of the circumferential portion, and the block diaphragms each may have a first end portion rotatably disposed on the circumferential portion and a second end portion connected to a spring to be elastically supported inward.

The block diaphragms may be positioned wherein both edge portions of adjacent block diaphragms overlap each other.

The first cap device may have a lower cap which is detachably mounted on the guide pipe and closes the fuel injection passage in close contact with the inlet of the fuel injection passage when mounted on the guide pipe, and an upper cap that closes the open side of the guide pipe and has a mounting hole for mounting the second cap device.

A coupling portion which is inserted into the inlet of the fuel injection passage may be formed at the lower cap, and threads corresponding to each other may be formed on an external side of the coupling portion and an internal side of the inlet of the fuel injection passage.

A thread may be formed along a circumference of the mounting hole of the upper cap and the second cap device may have a coupling portion which is thread-fastened to the mounting hole, and a grip protruding and formed across a center of the coupling portion.

Protrusive handles may be formed on the upper cap at positions aligned straight with the grip of the second cap device, and when the second cap device is thread-fastened to the mounting hole, the grip and the handles may be positioned in a straight line, and when the second cap device is turned at 90° or more, the second cap device may be unfastened.

The lower cap may be thread-fastened to the fuel injection passage and may have first fixing steps protruding at regular intervals on a top portion thereof and having a slope, and the upper cap may be disposed on the lower cap and may have first locking steps having a slope corresponding to the slope of the first fixing steps.

First fixing extensions that are elastically bent up and down may be formed at regular intervals on the lower cap and the first fixing steps may be formed at end portions of the first fixing extensions.

The second cap device may have: an internal cap which is thread-fastened to the mounting hole of the upper cap and has second fixing steps protruding at regular intervals on a top portion thereof and having a slope; and an external cap which is disposed over the internal cap and has a slope corresponding to the slope of the second fixing steps.

Threads for thread-fastening the lower cap of the first cap device and the fuel injection passage and threads for thread-fastening the internal cap of the second cap device and the upper cap may be formed in opposite directions.

The slopes of the first fixing steps and the slopes of the second fixing steps may be inclined in opposite directions, and the slopes of the first locking steps and the slopes of the second locking steps may be formed in opposite directions.

Inclination angles of the first fixing steps and the first locking steps may be greater than inclination angles of the second fixing steps and the second locking steps.

Protrusive handles may be formed around the mounting hole of the upper cap, and the handles may have a fixing mechanism that slides in and out of and is inserted into a fixing groove formed at the guide pipe when the first cap device is fastened to the guide pipe wherein the first cap device is maintained closed.

The fixing mechanism may have a button elastically supported by a spring to move into and out of the handle and a hook configured to be inserted into or separated out of the fixing groove when the button is moved into the handle.

An end portion of the button which is in contact with the hook may be inclined inward and outward and the hook may have a first end portion being in contact with the button and a second end portion bent to be inserted into the fixing groove.

A guide pin configured to circumferentially rotate may be disposed inside the mounting hole of the upper cap, a guide hole in which the guide pin is inserted may be formed on an external side of the second cap device, and the guide hole may extend wherein the guide pin is locked therein when the second cap device is inserted into the mounting hole of the first cap device, and the guide pin is separated when the second cap device is moved in an insertion direction thereof.

The guide hole may have a start point on a vertical line extending from a pivot point of the guide pin, a first bending point extending upward at an angle at a first side of the vertical line and then bending downward to a second side of the vertical line, a second bending point bending upward at the second side of the vertical line, and a third bending point bending downward, having a heart shape.

In the guide hole, a distance from the start point to the first bending point may be the longest and a distance from the second bending point to the third bending point may be the shortest.

In the guide hole, only the first bending point may be positioned at the first side of the vertical line, and the second bending point and the third bending point may be positioned at the second side of the vertical line.

A return plate elastically supported by a return spring may be disposed in the mounting hole of the upper cap, so an elastic force that pushes the second cap device out of the mounting hole may be applied to the second cap device.

The first cap device may be disposed wherein the upper cap is at a greater distance from the inlet of the fuel injection passage than the lower cap, and may have bridges connecting the lower cap and the upper cap to each other.

According to the dual cap assembly having multiple passages that has the structure described above, a fuel injection passage and a urea injection passage are unified are opened or closed by one cap assembly.

Accordingly, the fuel injection passage and the urea injection passage are connected to an injection port, so the disposition process is reduced, the design quality is improved, and the manufacturing cost is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
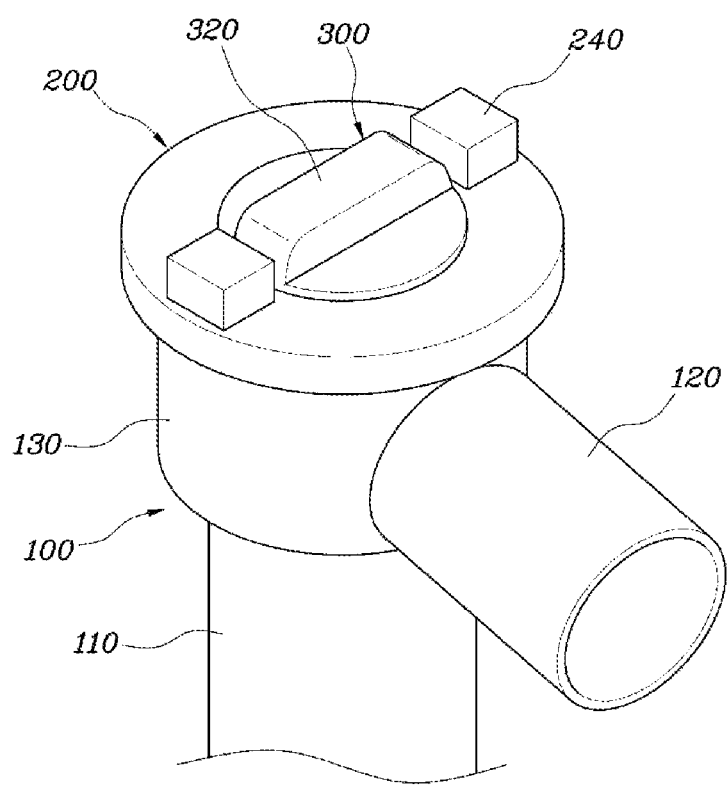
FIG. 1 is a view illustrating a dual cap assembly having multiple passages according to an exemplary embodiment of the present invention.

It should be understood that the appended drawings are not necessary to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

FIG. 1 is a view showing a dual cap assembly having multiple passages according to an exemplary embodiment of the present invention, and FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, and FIG. 19 are views illustrating the dual cap assembly having multiple passages as shown in FIG. 1.

A dual cap assembly having multiple passages according to an exemplary embodiment of the present invention, as shown in FIG. 1, includes a pipe device 100 having a plurality of separate passages, a first cap device 200 detachably mounted at a position where the passages diverge in the pipe device 100 to close a first passage, and a second cap device 300 detachably mounted on the first cap device 200 to close a second passage.

The present invention, as described above, includes the pipe device 100, the first cap device 200, and the second cap device 300, and the pipe device 100 has a plurality of separate passages. That is, the pipe device 100 has a plurality of separate passages, but only has a shared injection port for the plurality of passages. The first cap device 200 and the second cap device 300 are mounted at the injection passage of the pipe device 100. The first cap device 200 is detachably mounted at the position where the passages diverge in the pipe device 100 to close the first passage wherein the first passage is opened when it is separated.

The second cap device 300 is detachably mounted on the first cap device 200 to open or close the second passage and not the first passage which is opened or closed by the first cap device 200. That is, the second passage is closed when the second cap device 300 is mounted on the first cap device 200, and is opened when the second cap device 300 is separated from the first cap device 200.

Accordingly, when the first cap device 200 is mounted, the first passage of the pipe device 100 is closed, and when the first cap device 200 is separated, the first passage is opened. Furthermore, when the second cap device 300 is mounted with the first cap device 200 mounted on the pipe device 100, both of the first and second passages are closed, and when the second cap device 300 is separated, the second passage is opened while the first passage closed.

Therefore, according to an exemplary embodiment of the present invention, a plurality of passages share an injection passage and the first cap device 200 and the second cap device 300 are assembled as a single cap device and detachably mounted on the pipe device 100, so it is possible to selectively open or close any one of a plurality of passages by mounting and separating the first cap device 200 or the second cap device 300.

Figure 5:
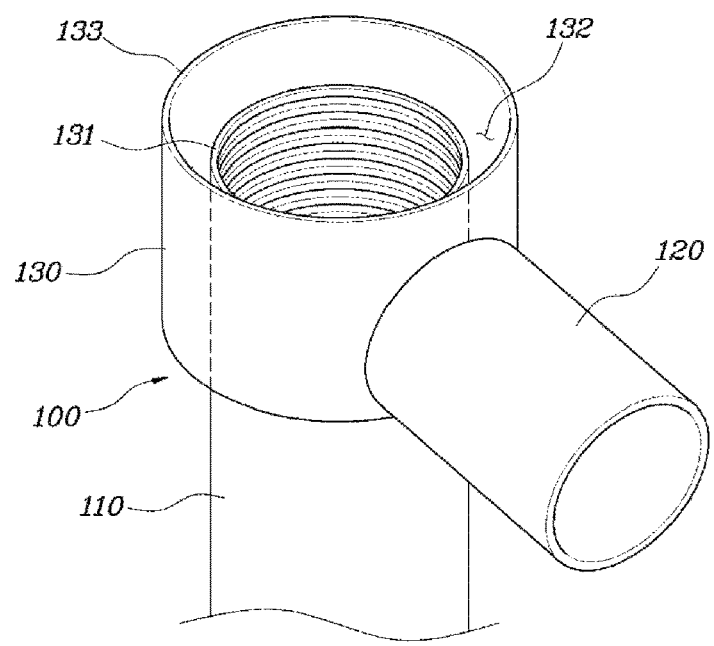

The present invention is described in detail hereafter. As shown in FIG. 1 and FIG. 5, the pipe device 100 may be divided into a fuel injection passage 110 and a urea injection passage 120 for keeping fuel and urea respectively.

That is, the cap assembly of the present invention has been designed to unify injection of urea and fuel, and the plurality of passages of the pipe device 100 may be the fuel injection passage 110 and the urea injection passage 120. A fuel tank and other corresponding components may be disposed in the fuel injection passage 110 for keeping fuel, and a urea tank and other corresponding components may be disposed in the urea injection passage 120 for keeping urea.

As shown in FIG. 1 and FIG. 5, to unify urea injection and fuel injection, the cap assembly may further include a guide pipe 130 disposed at the inlet of the fuel injection passage 110 and connected to the urea injection passage 120 to separate the fuel injection passage 110 and urea injection passage 120.

The guide pipe 130 allows the fuel injection passage 110 and the urea injection passage 120 to share the single injection port wherein fuel and urea injected into the injection port through the guide pipe 130 can be separately injected into the fuel injection passage 110 and the urea injection passage 120.

In detail, the guide pipe 130 may have a fixing portion 131 surrounding the inlet of the fuel injection passage 110 and a circumferential portion 133, formed wider than the fixing portion 131, forming a channel 132 with the fixing portion 131, connected to the urea injection passage 120, and having an open side.

The guide pipe 130 includes the fixing portion 131 and the circumferential portion 133, the fixing portion 131 is fixed to the inlet of the fuel injection passage 110, and the circumferential portion 133, extending from the fixing portion 131, is formed wider than the fixing portion 131, forming the channel 132 with the fixing portion 131. That is, the guide pipe 130 functions as a conventional injection port for fuel and urea, fuel can be injected through the fuel injection passage 110 with the fixing portion 131 fixed, and urea can be injected into the urea injection passage 120 through the channel 132 formed by the circumferential portion 133.

Accordingly, when the first cap device 200 is separated from the guide pipe 130, the fuel injection passage 110 is opened, allowing fuel to be injected. Furthermore, when the second cap device 300 is separated while the first cap device 200 remains mounted, the urea injection passage 120 is opened with the fuel injection passage 110 closed, allowing urea to be injected.

In the guide pipe 130, the circumferential portion 133 may extend to a greater height than the fixing portion 131. The first cap device 200 is mounted on the guide pipe 130, but when the circumferential portion 133 and the fixing portion 131 are the same in height, the fuel injection passage 110 and the urea injection passage 120 are both closed when the first cap device 200 is mounted, so it may be problematic in separate injection of fuel and urea. Accordingly, the circumferential portion 133 is formed to extend to the greater height than the fixing portion 131, so when the first cap device 200 is mounted on the circumferential portion 133 a region through which fluid flows into the channel 132 is ensured with the fuel injection passage 110 closed. Furthermore, when the second cap device 300 is separated from the first cap device 200, fluid can flow into the urea injection passage 120 through the ensured region. The present mechanism is related to a shape of the first cap device 200 to be described below.

Figure 9:
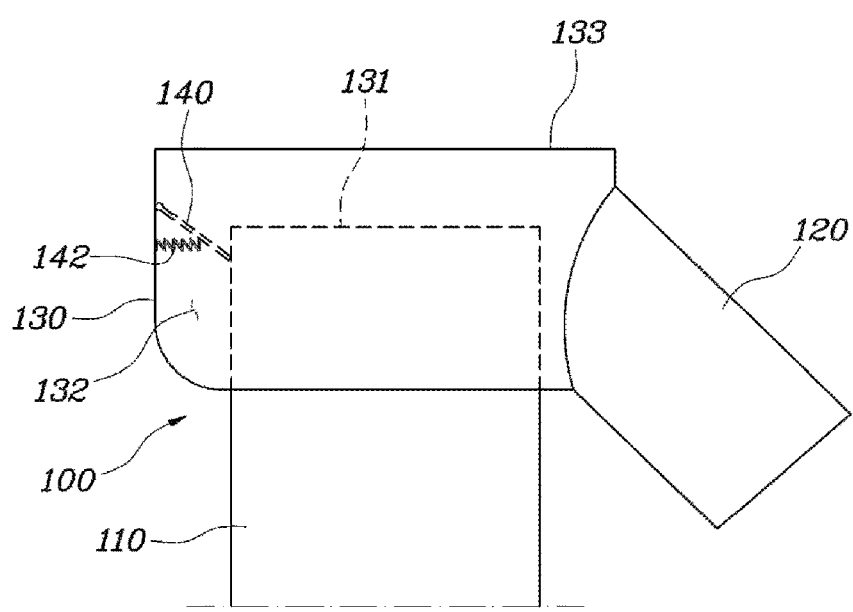
FIG. 9 and FIG. 10 are view illustrating a block diaphragm structure according to an exemplary embodiment of the present invention.
Figure 10:
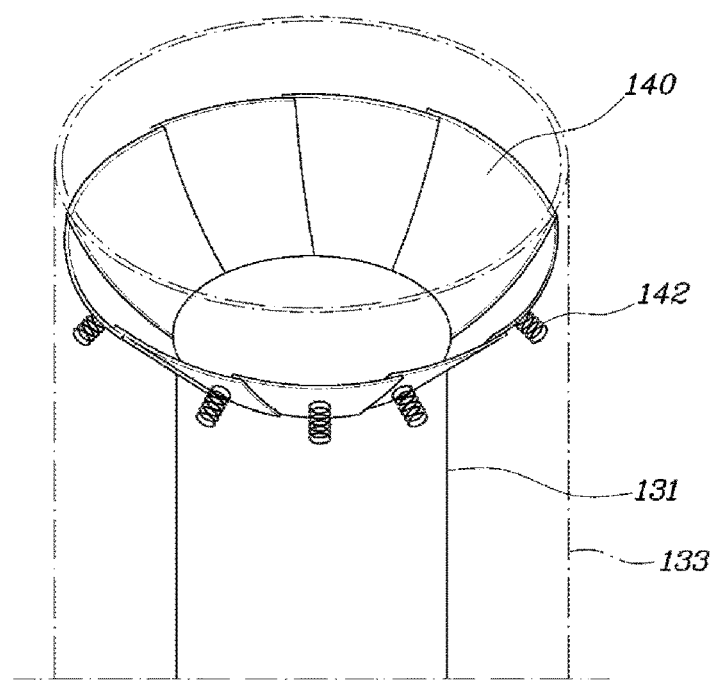

On the other hand, referring to FIG. 9 and FIG. 10, a block diaphragm 140 which is elastically turned toward the fixing portion 131 to come in contact with the fixing portion 131 may be formed on the circumferential portion 133.

The block diaphragm 140 is configured to prevent fuel that flows into the fuel injection passage 110 from flowing into the channel 132. That is, when the first cap device 200 is separated from the guide pipe 130, the block diaphragm 140 is elastically turned and brought in contact with the fixing portion 131, so fluid can flow only into the fuel injection passage 110. Furthermore, when the first cap device 200 is mounted, the block diaphragm 140 is pushed and turned by the first cap device 200, so fluid is allowed to flow into the channel 132.

In detail, a plurality of block diaphragms 140 may be provided and the block diaphragms 140 may be separated from each other around the internal side of the circumferential portion 133 with a first end portion rotatably coupled to the circumferential portion 133 and a second end portion connected to a spring 142 to be elastically supported inward. As shown in FIG. 9, the block diaphragm 140 has a first end portion rotatably coupled to the internal side of the circumferential portion 133 and a second end portion connected to a spring 142 which is fixed to the circumferential portion 133 to be elastically turned toward the fixing portion 131.

Accordingly, when the first cap device 200 is separated from the guide pipe 130, the block diaphragms 140 are turned and brought in contact with the fixing portion 131 by the elasticity of the spring 142, wherein the urea injection passage 120 is closed. Furthermore, when the first cap device 200 is mounted on the guide pipe 130, the block diaphragms 140 are pushed and turned by the first cap device 200, wherein the urea injection passage 120 can be opened.

The block diaphragms 140 may be positioned wherein both end portions of adjacent block diaphragms 140 overlap each other. According to an exemplary embodiment of the present invention, the block diaphragms 140 are positioned around the circumferential portion 133, and when they are turned, the distance between adjacent block diaphragms 140 decreases. Accordingly, as shown in FIG. 10, since the block diaphragms 140 are positioned wherein both edge portions of adjacent block diaphragms 140 overlap each other, adjacent block diaphragms 140 can be smoothly turned even when they interfere with each other.

Figure 6:
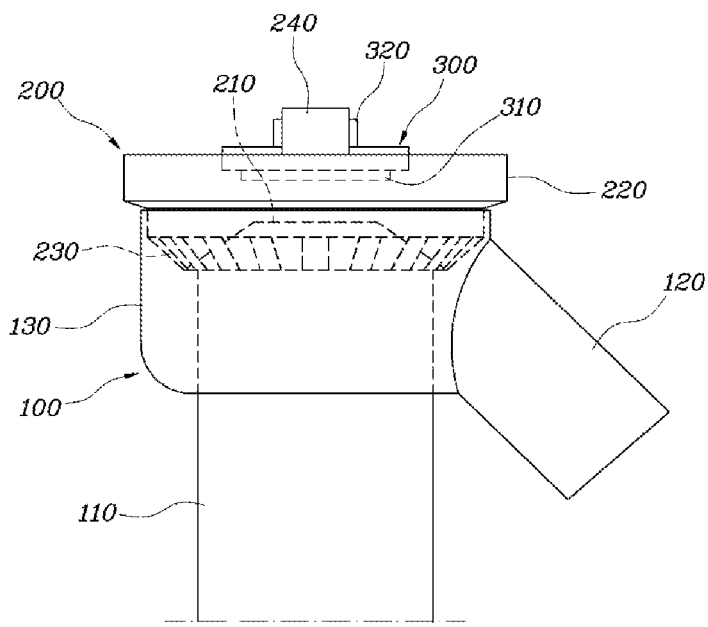
FIG. 6 is a view illustrating a first cap and a second cap according to an exemplary embodiment of the present invention.

On the other hand, as shown in FIG. 6, the first cap device 200 may have a lower cap 210 which is detachably mounted on the guide pipe 130 and closes the fuel injection passage 110 in close contact with the inlet of the fuel injection passage 110 when mounted on the guide pipe 130, and an upper cap 220 that closes the open side of the guide pipe 130 and has a mounting hole 222 for mounting the second cap device 300.

As described above, the first cap device 200 has the lower cap 210 for closing the fuel injection passage 110 and the upper cap 220 for closing the open side of the guide pipe 130, so urea internally flowing through the mounting hole 222 can flow between the lower cap 210 and the upper cap 220 and can keep flowing into the urea injection passage 120 through the channel 132.

A lower cap 210 may be a rubber packing which comes in close contact with the inlet of the fuel injection passage 110, the mounting hole 222 in which the second cap device 300 is mounted and through which urea internally flows may be formed in the upper cap 220, and the upper cap 220 may cover the circumferential portion 133 of the guide pipe 130. Furthermore, the lower cap 210 is brought in contact with the fixing portion 131 of the guide pipe 130, described above, and the upper cap 220 may be formed greater than the width of the fixing portion 131 to be locked on the circumferential portion 133 of the guide pipe 130. Accordingly, when the first cap device 200 is mounted on the guide pipe 130, the lower cap 210 closes the fuel injection passage 110, and the upper cap 220 and the second cap device 300 close the open side of the guide pipe 130. When the second cap device 300 is separated from the first cap device 200, urea injected through the mounting hole 222 can flow into the urea injection passage 120 through the channel 132.

Figure 4:
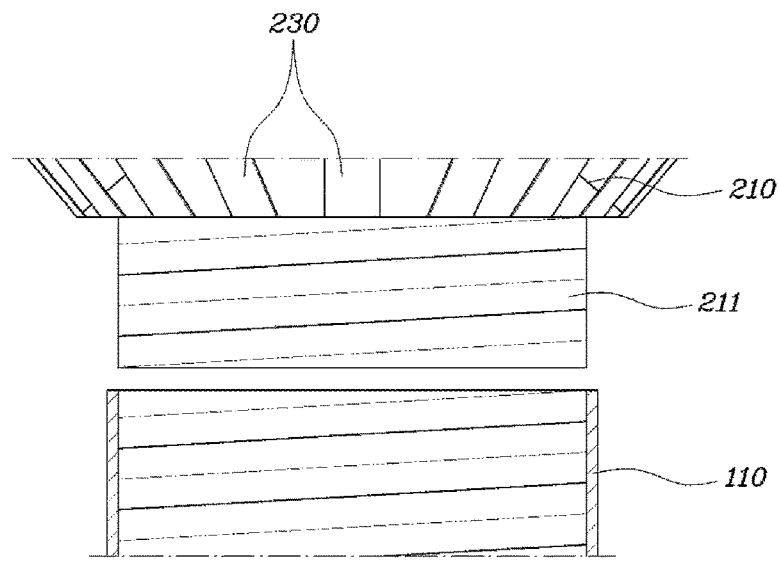
FIG. 4 and FIG. 5 are views illustrating a coupling portion according to an exemplary embodiment of the present invention.

As shown in FIG. 4 and FIG. 5, a coupling portion 211 which is inserted into the inlet of the fuel injection passage 110 is formed at the lower cap 210 and corresponding threads may be formed on the external side of the coupling portion 211 and the internal side of the inlet of the fuel injection passage 110.

Although the coupling portion 211 of the lower cap 210 may be simply inserted into the inlet of the fuel injection passage 110, it is possible to improve a fastening force through thread-fastening, by forming corresponding threads on the external side of the coupling portion 211 and the internal side of the inlet of the fuel injection passage 110.

Figure 2:
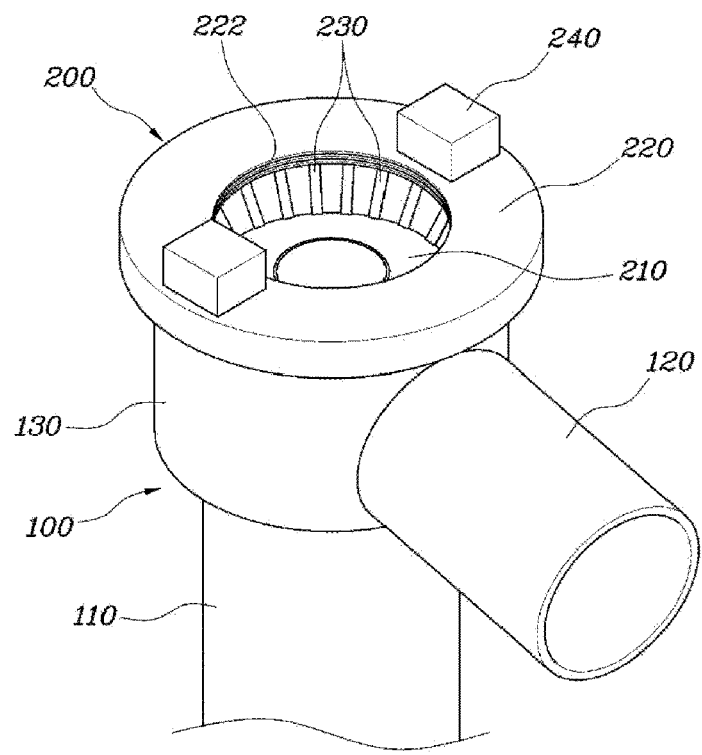
FIG. 2 and FIG. 3 are views illustrating an upper cap and a lower cap of a first cap device according to an exemplary embodiment of the present invention.
Figure 3:
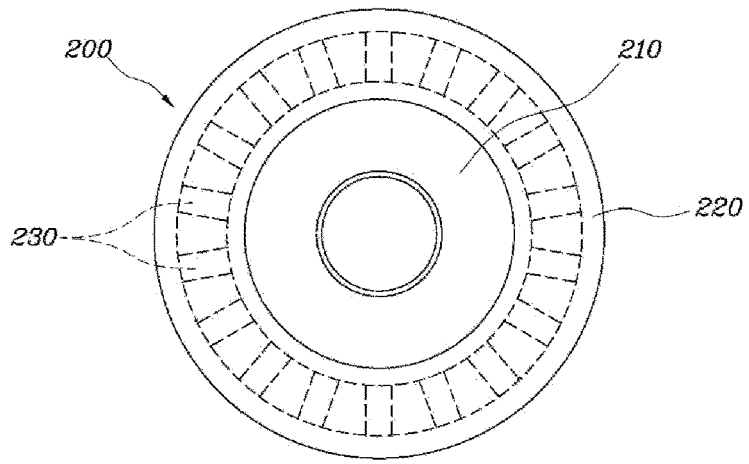

Furthermore, as shown in FIG. 2 and FIG. 3, the first cap device 200 may be disposed wherein the upper cap 220 is at a greater distance from the inlet of the fuel injection passage 110 than the lower cap 210, and may have bridges 230 connecting the lower cap 210 and the upper cap 220.

The upper cap 220 of the first cap device 200 is accommodated on the circumferential portion 133 of the guide pipe 130 and the lower cap 210 is in close contact with the fuel injection passage 110, wherein the upper and lower caps are separated from each other. Furthermore, the upper cap 220 and the lower cap 210 are connected through the bridges 230. The bridges 230 are positioned at regular intervals along the circumference of the lower cap 210 and the upper cap 220. Since the bridges 230 are separated from each other, urea can flow into the channel 132 through gaps formed between the bridges 230.

A center of the lower cap 210 may protrude at an angle toward the upper cap 220. That is, the lower cap 210 is positioned to correspond to the mounting hole 222 of the upper cap 220, wherein urea injected through the mounting hole 222 comes in contact with the lower cap 210. Accordingly, since the center of the lower cap 210 protrudes at an angle toward the upper cap 220, urea which is injected through the mounting hole 222 can flow smoothly on the inclined portion of the lower cap 210 into the channel 132.

Meanwhile, as shown in FIG. 1, FIG. 2 and FIG. 6, a thread is formed along the circumference of the mounting hole 222 of the upper cap 220 and the second cap device 300 may have a coupling portion 310 which is thread-fastened to the mounting hole 222, and a grip 320 protruding and formed across the center of the coupling portion 310.

The second cap device 300 can be thread-fastened to the mounting hole 222 of the upper cap 220 through the coupling portion 310, and a user can directly turn the second cap device 300 using the grip 320 protruding from the coupling portion 310. Accordingly, the fastening force between the second cap device 300 and the upper cap 220 can be improved by the above thread-fastening, and the second cap device 300 can be conveniently operated by the grip 320.

Protrusive handles 240 are formed on the upper cap 220 at positions aligned straight with the grip 320 of the second cap device 300, so a user can easily directly turn the first cap device 200 using the handles 240.

When the second cap device 300 is thread-fastened to the mounting hole 222, the grip 320 and the handles 240 are positioned in a straight line, and when the second cap device 300 is turned by 90° or more, the second cap device 300 can be unfastened. When the second cap device 300 is fully mounted on the first cap device 200, the grip 320 of the second cap device 300 and the handles 240 of the first cap device 200 are aligned in a straight line, thus a user can visually verify that the second cap device 300 has been fully mounted on the first cap device 200. Furthermore, when the grip 320 is turned 90° or more from the handles 240 to turn the second cap device 300 at 90° or more so that the second cap device 300 can be separated, a user can know that the second cap device 300 can be separated.

However, the second cap device 300 is mounted on the first cap device 200 after the first cap device 200 is mounted on the guide pipe 130 and the second cap device 300 is closed or opened by turning, so the operations of opening or closing the first cap device 200 and the second cap device 300 should not interfere with each other.

Various exemplary embodiments for the above purpose are described hereafter.

Figure 11:
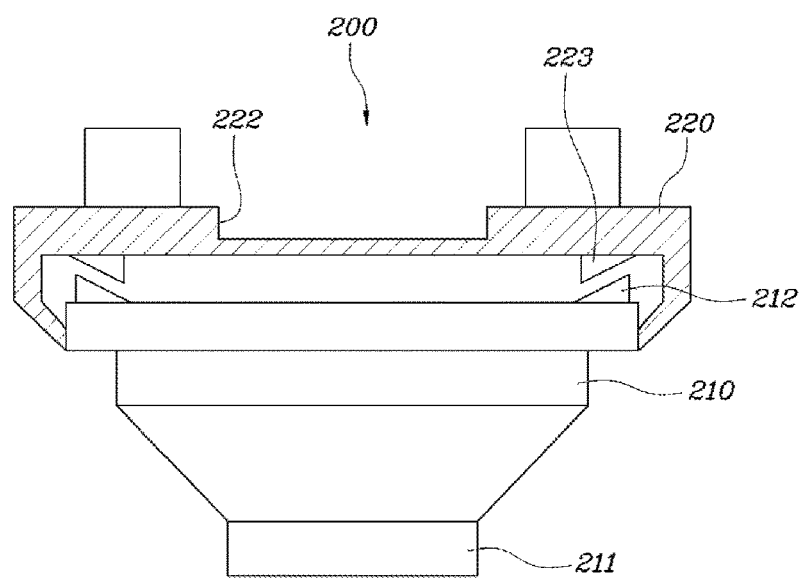
FIG. 11, FIG. 12, FIG. 13, and FIG. 14 are views illustrating a first locking structure according to an exemplary embodiment of the present invention.
Figure 12:
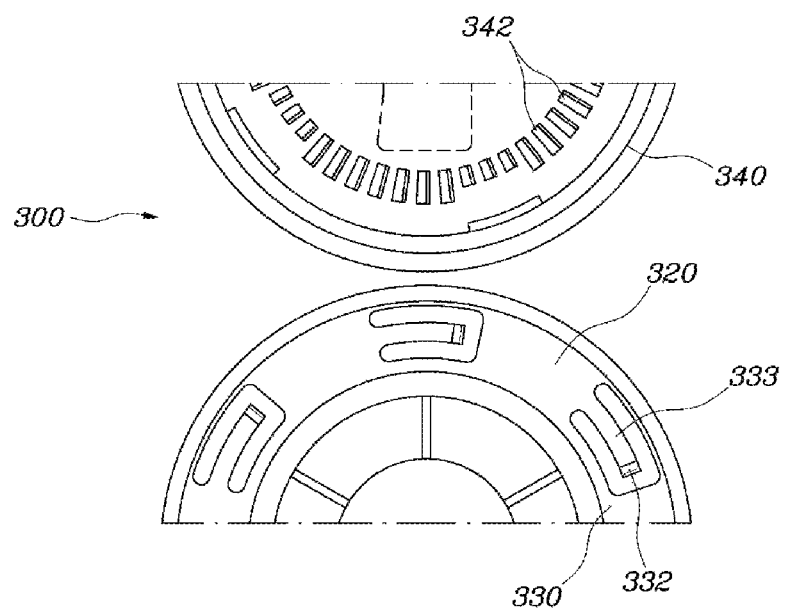
Figure 13:
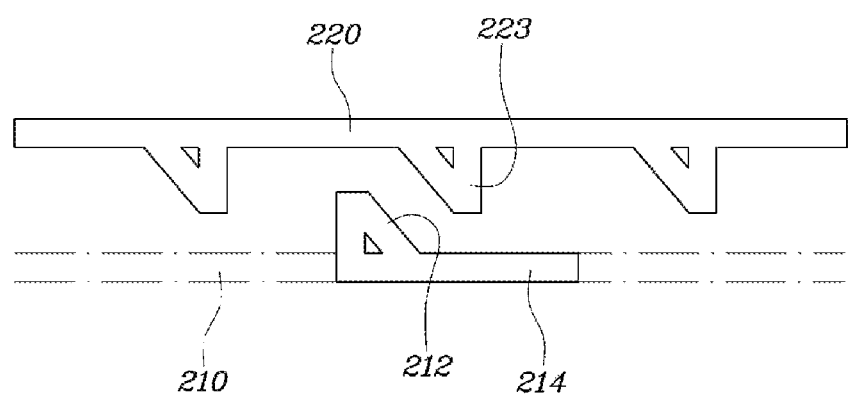

FIG. 11, FIG. 12, FIG. 13, and FIG. 14 show a locking structure of various exemplary embodiments. As shown in FIG. 11 and FIG. 13, the lower cap 210 is thread-fastened to the fuel injection passage 110 and has first fixing steps 212 protruding at regular intervals on the top portion thereof and having a slope, and the upper cap 220 is disposed on the lower cap 210 and has first locking steps 223 having a slope corresponding to the slope of the first fixing steps 212.

The upper cap 220 and the lower cap 210 of the first cap device 200 are divided, the lower cap 210 is thread-fastened to the fuel injection passage, and the upper cap 220 covers the upper portion of the lower cap 210 wherein the lower cap 210 can rotate and axially move.

Accordingly, an opening direction of the first cap device 200 may be determined as the direction when the slopes of the first locking steps 223 on the first cap 220 slide over the slopes of the first fixing steps 212 on the lower cap 210, and a closing direction may be determined as the direction when the upper cap 220 is turned in the opposite direction and the first locking steps 223 are locked to the first fixing steps 212.

Accordingly, when the upper cap 220 of the first cap device 200 is turned in the closing direction to couple the first cap 220 to the guide pipe 130, the first locking steps 223 are locked to the first fixing steps 212, so the upper cap 220 and the lower cap 210 are turned together and the lower cap 210 is accommodated in the fuel injection passage. In contrast, when the upper cap 220 of the first cap device 200 is turned in the opening direction to separate the first cap device 200 from the guide pipe 130, the first locking steps 223 slide over the first fixing steps 212 and only the upper cap 220 is turned, so the first cap device is not opened. Accordingly, a user has to press the upper cap 220 when turning it, so the first locking steps 223 are locked to the first fixing steps 212 and the upper cap 220 is turned with the lower cap 210, wherein the first cap device can be opened.

For smooth operation between the first fixing steps 212 and the first locking steps 223, first fixing extensions 214 that are elastically bent up and down may be formed at regular intervals on the lower cap 210 and the first fixing steps 212 may be formed at end portions of the first fixing extensions 214. The first fixing extensions 214 are formed in a shape of a cantilever that can be elastically deformed, and the first fixing steps 212 are formed at end portions of the first fixing extensions 214, so damage can be prevented and smooth operation is possible when the first locking steps 223 slide over the first fixing steps 212 or are pressed on the first fixing steps 212.

Figure 14:
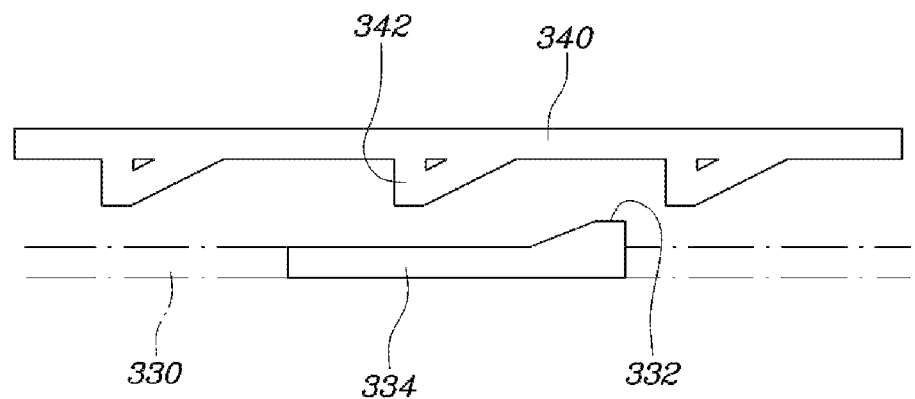

On the other hand, as shown in FIG. 12 and FIG. 14, the second cap device 300 has an internal cap 330 which is thread-fastened to the mounting hole 222 of the upper cap 220 and has second fixing steps 332 protruding at regular intervals on the top portion thereof and having a slope and an external cap 340 which is disposed over the internal cap 330 and has a slope corresponding to the slope of the second fixing steps 332.

The internal cap 330 and the external cap 340 of the second cap device 300 are divided, the internal cap 330 is thread-fastened to the mounting hole 222 of the upper cap 220, and the external cap 340 covers the upper portion of the internal cap 330 so that the internal cap 330 can rotate and axially move.

Accordingly, an opening direction of the second cap device 300 may be determined as the direction when the slopes of the second locking steps 342 on the external cap 340 slide over the slopes of the second fixing steps 332 on the internal cap 330, and a closing direction may be determined as the direction when the external cap 340 is turned in the opposite direction and the second locking steps 342 are locked to the second fixing steps 332.

Accordingly, when the external cap 340 of the second cap device 300 is turned in the closing direction to couple the second cap device 300 to the mounting hole 222 of the first cap device 200, the second locking steps 342 are locked to the second fixing steps 332, so the external cap 340 and the internal cap 330 are turned together and the internal cap 330 is fastened to the first cap device 200. In contrast, when the external cap 340 of the second cap device 300 is turned in the opening direction to separate the second cap device 300 from the first cap device 200, the second locking steps 342 slide over the second fixing steps 332 and only the external cap 340 is turned, so the second cap device is not opened. Accordingly, a user has to press the external cap 340 when turning it, so the second locking steps 342 are locked to the second fixing steps 332 and the external cap 340 is turned with the internal cap 330, wherein the second cap device can be opened.

For smooth operation between the second fixing steps 332 and the second locking steps 342, the second fixing steps 332 may be formed on second fixing extensions 333 that are formed in the shape of a cantilever that can be elastically deformed.

The threads for thread-fastening between the fuel injection passage and the lower cap 210 of the first cap device 200 and the threads for thread-fastening between the upper cap 220 and the internal cap 330 of the second cap device 300 may be formed in opposite directions. That is, the closing direction when the first cap device 200 is fastened to the guide pipe is the opening direction when the second cap device 300 is separated from the first cap device 200, while the opening direction when the first cap device 200 is separated from the guide pipe is the closing direction when the second cap device 300 is fastened to the first cap device 200.

Furthermore, the slopes of the first fixing steps 212 and the slopes of the second fixing steps 332 may be inclined in the opposite directions, and the slopes of the first locking steps 223 and the slopes of the second locking steps 342 may be inclined in the opposite directions.

Since the opening or closing directions of the first cap device 200 are opposite to the opening or closing directions of the second cap device 300, the slopes of the first fixing steps 212 and the second fixing steps 332 and the slopes of the first locking steps 223 and the second locking steps 342 are formed in opposite directions.

Accordingly, influence on the first cap device 200 by a torque which is generated when the second cap device 300 is fastened to the first cap device 200 is minimized.

For example, when the external cap 340 of the second cap device 300 is turned to couple the second cap device 300 to the first cap device 200, the second locking steps 342 are locked to the second fixing steps 332 on the internal cap 330, so the internal cap 330 is also turned and is thread-fastened to the mounting hole 222. Torque is applied in the opening direction to the first cap device 200 opposite to the closing direction of the second cap device 300 in the present process. Furthermore, the upper cap 220 of the first cap device 200 is turned in the opening direction, the first locking steps 223 slide over the first fixing steps 212, so only the upper cap 220 is turned and the first cap device is not opened. That is, the second cap device 300 is fastened to the first cap device 200, but the first cap device 200 is fixed at the current position and maintained in a closed state.

On the other hand, when the external cap 340 of the second cap device 300 is turned in the opposite direction, that is, in the opening direction, the second locking steps 342 on the external cap 340 slide over the second fixing steps 332 on the internal cap 330. A user has to press and turn the external cap 340 in the opening direction to separate the second cap device 300 from the first cap device 200, and in the present process, the second locking steps 342 on the external cap 340 are in surface-contact with the second fixing steps 332 on the internal cap, so the external cap 340 and the internal cap 330 are turned together, wherein the second cap device 300 is turned in the opening direction and can be separated. Torque is applied in the closing direction to the first cap device 200, so the first cap device is maintained in the closed state. Furthermore, the first locking steps 223 and the first fixing steps 212 are locked to each other, so torque is applied in the closing direction, wherein only the second cap device 300 can be turned.

When the upper cap 220 is turned to couple the first cap device 200 to the guide pipe 130, the first locking steps 223 on the upper cap 220 are locked to the first fixing steps 212 on the lower cap 210, so the lower cap 210 is also turned and is accommodated in the fuel injection passage 120.

On the other hand, a user has to press and turn the upper cap 220 in the opening direction to separate the first cap device 200 from the guide pipe 130, and in the present process, the first locking steps 223 on the upper cap 220 are in surface-contact with the first fixing steps 212 on the lower cap 210, so the upper cap 220 and the lower cap 210 are turned together. Accordingly, the first cap device 200 is turned in the opening direction and can be separated from the guide pipe 130.

As described above, the torque which is applied to the first cap device 200 and the torque which is applied to the second cap device 300 do not interfere with each other when the first cap device 200 and the second cap device 300 are fastened and separated, so the first cap device 200 and the second cap device 300 can be separately mounted and separated. Accordingly, it is possible to smoothly fasten or separate the second cap device 300 to or from the mounting hole 222 of the first cap device 200, with the first cap device 200 mounted on the guide pipe 130.

The inclination angles of the first fixing steps 212 and the first locking steps 223 are made greater than the inclination angles of the second fixing steps 332 and the second locking steps 342, so a force required for fastening the second cap device 300 to the first cap device 200 can be greater than a force for fastening the first cap device 200 to the guide pipe 130. Accordingly, the torque which is applied to the first cap device 200 is minimized when the second cap device 300 is fastened or separated to or from the first cap device 200, so smooth operation can be performed.

Figure 15:
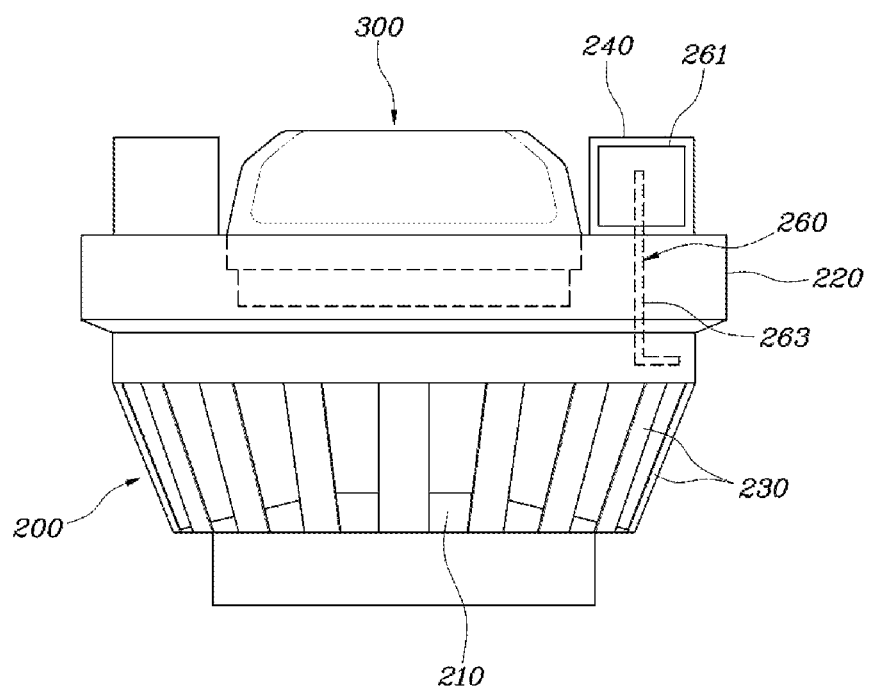
FIG. 15, FIG. 16, and FIG. 17 are views illustrating a second locking structure according to an exemplary embodiment of the present invention.
Figure 16:
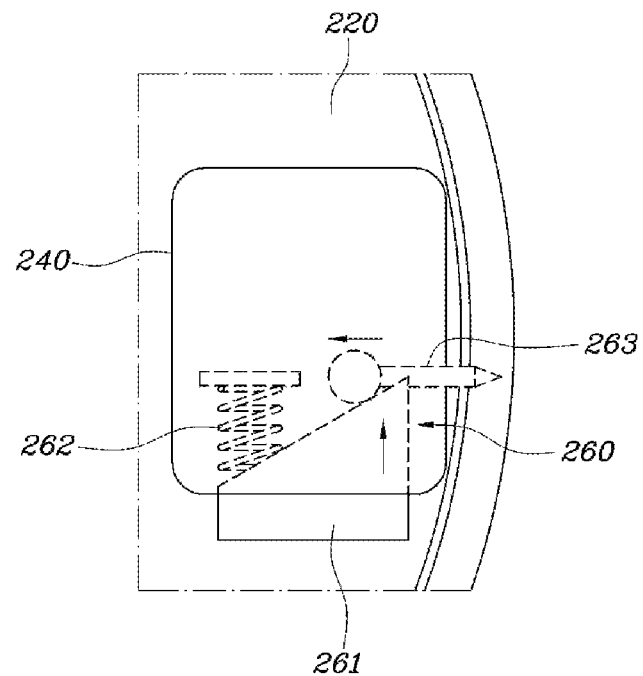
Figure 17:
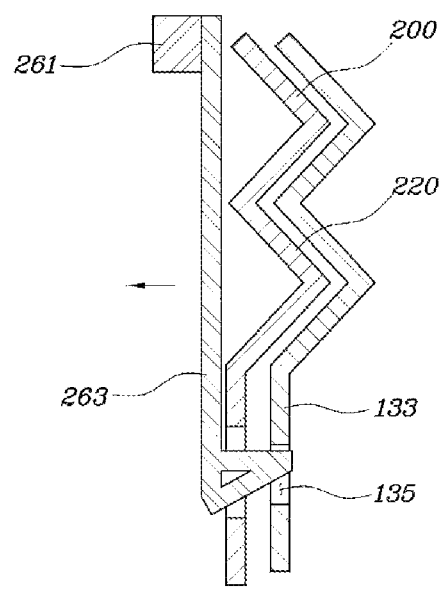

FIG. 15, FIG. 16, and FIG. 17 show various exemplary embodiments which is a button type fixing structure. As shown in the figures, protrusive handles 240 are formed around the mounting hole 222 of the upper cap 220 and the handles 240 may have a fixing mechanism 260 that slides in and out and is inserted into a fixing groove 135 formed at the circumferential portion 133 of the guide pipe 130 when the first cap device 200 is fastened to the guide pipe 130 so that the first cap device 200 is maintained in the closed state.

That is, when the fixing mechanism 250 is inserted into the fixing groove 135 formed at the circumferential portion 133 of the guide pipe 130, the position of the upper cap 220 is fixed on the guide pipe 130.

In detail, as shown in FIG. 16 and FIG. 17, the fixing mechanism 260 may include a button 261 elastically supported by a spring 262 to move into and out of the handle 240 and a hook 263 moving to be inserted into or separated out of the fixing groove 135 when the button 261 is moved in the handle 240.

An end portion of the button 261 which is in contact with the hook 263 is inclined inward and outward and the hook 263 may have a first end portion being in contact with the button 261 and a second end portion bent to be inserted into the fixing groove 135.

Accordingly, as shown in FIG. 16 and FIG. 17, when the button 261 is pushed into the handle 240, a first end portion of the hook 263 slides over the inclined portion of the button 261, so a second end portion of the hook 263 is separated out of the fixing groove 135. Accordingly, the first cap device 200 can be turned about the guide pipe 130, so the first cap device 200 can be opened and separated from the guide pipe 130.

On the other hand, when the button 261 that has been pushed is released, the button 261 is returned by the elasticity of the spring 262 and the hook 263 is also returned by sliding over the inclined portion of the button 261, so the second end portion of the hook 263 can be reinserted into the fixing groove 135 of the guide pipe 130. Accordingly, when the hook 263 of the fixing mechanism 260 is inserted and locked in the fixing groove 135 of the guide pipe 130 with the first cap device 200 mounted on the guide pipe 130, rotation of the first cap device 200 is limited and the first cap device 200 is not separated even when an external force including the force which is applied to the second cap device 300 is applied.

Figure 18:
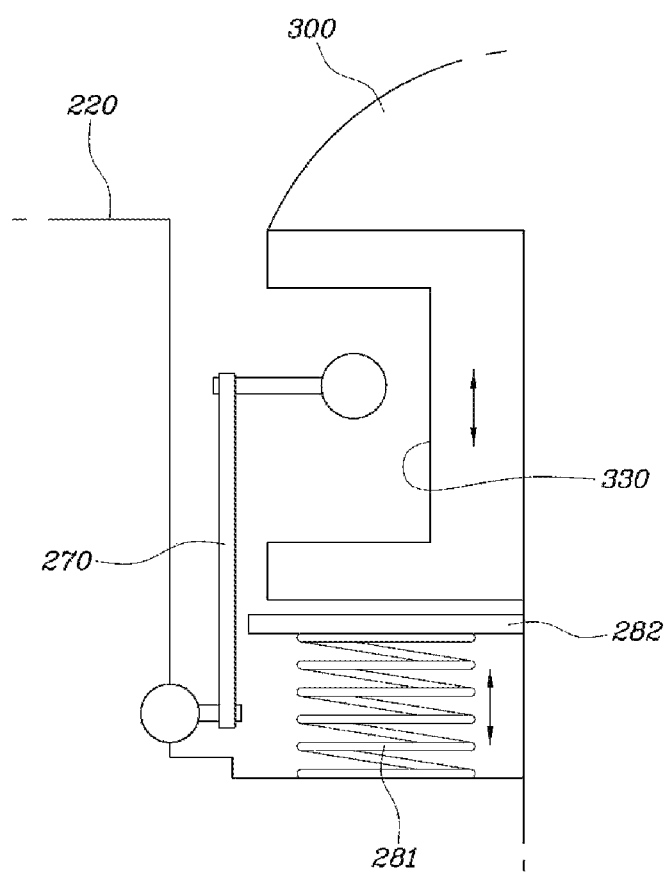
FIG. 18 and FIG. 19 are views illustrating a third locking structure according to an exemplary embodiment of the present invention.
Figure 19:
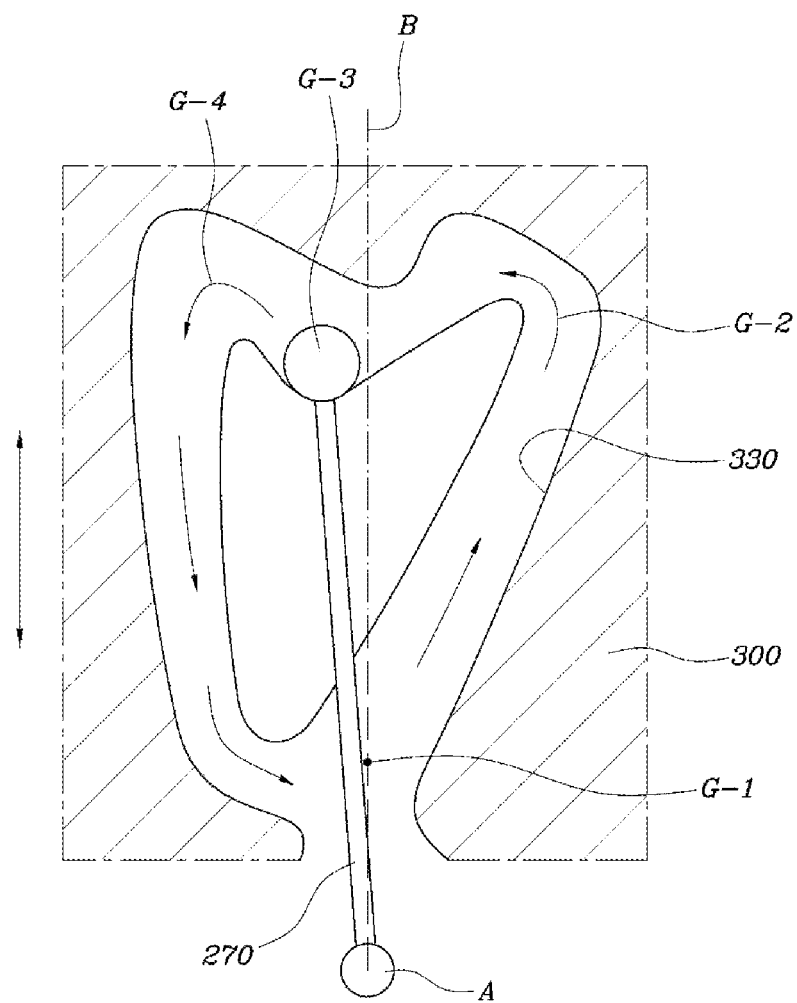

Various exemplary embodiments is a push-and-push type fixing structure. As shown in FIG. 18 and FIG. 19, a guide pin 270 that can circumferentially rotate is internally disposed within the mounting hole 222 of the upper cap 220, a guide hole 330 in which the guide pin 270 is inserted is formed on the external side of the second cap device 300. The guide hole 330 may extend wherein the guide pin 270 is locked therein when the second cap device 300 is inserted into the mounting hole 222 of the first cap device 200, and the guide pin 270 is separated when the second cap device 300 is moved in an insertion direction thereof.

That is, when the second cap device 300 is perpendicularly inserted into the mounting hole 222 of the first cap device 200, the second cap device 300 may be fixed or separated by the relationship between the guide pin 270 and the guide hole 330. The guide pin 270 can circumferentially rotate and may be bent to be inserted into the guide hole 330.

In detail, the guide hole 330 may have a start point G-1 on a vertical line B extending from a pivot point one of the guide pin 270, a first bending point G-2 extending upward at an angle at a first side of the vertical line B and then bending downward to a second side of the vertical line B, a second bending point G-3 which bends upward at the second side of the vertical line B, and a third bending point G-4 bending downward, having a heart shape. The guide hole 330 may curve wherein the guide pin 270 can be sequentially guided through the start point G-1, the first bending point G-2, the second bending point G-3, the third bending point G-4, and the start point G-1.

Accordingly, as shown in FIG. 19, when the second cap device 300 is pushed to be fastened to the first cap device 200, the guide pin 270 is moved from the start point G-1 to the first bending point G-2 and then guided to the second bending point G-3. Accordingly, the guide pin 270 is locked to the second bending point G-3 which is recessed while the second cap device 300 is locked to the guide pin 270 and fastened to the first cap device 200. When the second cap device 300 is pushed again, the guide pin 270 is moved from the second bending point G-3 to the third bending point G-4 and is then returned to the start point G-1, so the guide pin 270 is separated out of the guide hole 330. Accordingly, the second cap device 300 can be separated from the first cap device 200.

To the present end, in the guide hole 330, a distance from the start point G-1 to the first bending point G-2 may be the longest and a distance from the second bending point G-3 to the third bending point G-4 may be the shortest. Furthermore, only the first bending point G-2 may be positioned at the first side of the vertical line B, and the second bending point G-3 and the third bending point G-4 may be positioned at the second side of the vertical line B.

Accordingly, when the second cap device 300 is pushed to be fastened to the first cap device 200, the guide pin 270 is moved to the first bending point G-2 having the longest distance, so the second cap device 300 can be fixed only when it is sufficiently inserted into the mounting hole 222 of the first cap device 200, wherein it is possible to easily recognize the locking state. Furthermore, when the second cap device 300 is pushed again with the guide pin 270 positioned at the second bending point G-3, the guide pin 270 is moved to the third bending point G-4, but the distance between the second bending point G-3 and the third bending point G-4 is short, so the second cap device 300 can be moved to the separable position by a small force.

On the other hand, a return plate 282 elastically supported by a return spring 281 is disposed in the mounting hole 222 of the upper cap 220, so an elasticity that pushes the second cap device 300 out of the mounting hole 222 may be applied to the second cap device 300. Accordingly, a force is required to insert the second cap device 300 into the mounting hole 222 because the second cap device 300 compresses the return spring 271 by pressing the return plate 282, and when the second cap device 300 is separated out of the mounting hole 222, the second cap device 300 is pushed out of the mounting hole 222 by the elasticity of the return spring 281, so a convenience in use is improved.

Furthermore, when the second cap device 300 is inserted into the mounting hole 222 of the first cap device 200, the elasticity of the return spring 281 is applied to the second cap device 300 with the guide pin 270 locked in the guide hole 330, so the guide pin 270 can be maintained locked in the guide hole 330.

The first cap device 200 may be fastened to the guide pipe 130 and the second cap device 300 may be fastened to the first cap device 200 through various exemplary embodiments, as described above.

The operation of the dual cap assembly having multiple passages according to an exemplary embodiment of the present invention is described hereafter.

As shown in FIG. 6, the first cap device 200 is mounted on the guide pipe 130 to which the fuel injection passage 110 and the urea injection passage 120 are connected, and when the second cap device 300 is mounted on the first cap device 200, the fuel injection passage 110 and the urea injection passage 120 are both closed. That is, when the first cap device 200 is mounted on the guide pipe 130, the lower cap 210 closes the fuel injection passage 110 in close contact with the fuel injection passage 110 and the open side of the guide pipe 130 is closed by the upper cap 220 and the second cap device 300 mounted on the upper cap 220, so the urea injection passage 120 is also closed.

Figure 7:
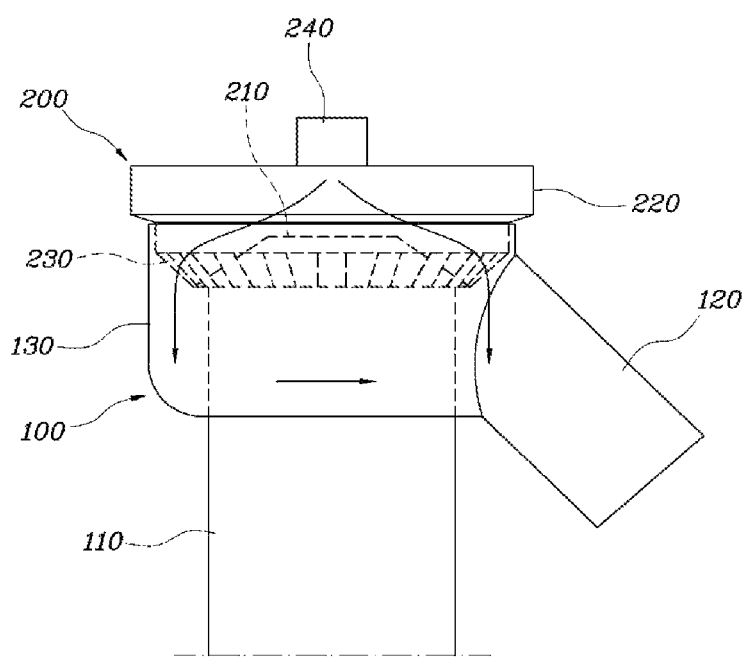
FIG. 7 is a view illustrating a urea injection mode according to an exemplary embodiment of the present invention.

When it is required to inject urea, as shown in FIG. 7, a user separates the second cap device 300 with the first cap device 200 remaining mounted on the guide pipe 130. Accordingly, the mounting hole 222 of the first cap device 200 is opened, so urea can be injected. Accordingly, when urea is injected through the guide pipe 130, the urea injected through the mounting hole 222 of the first cap device 200 moves over the inclined portion of the lower cap 210 and flows into the channel 132 through the gaps of the bridges 230. The urea flowing into the channel 132 can flow into a urea tank through the urea injection passage 120.

Figure 8:
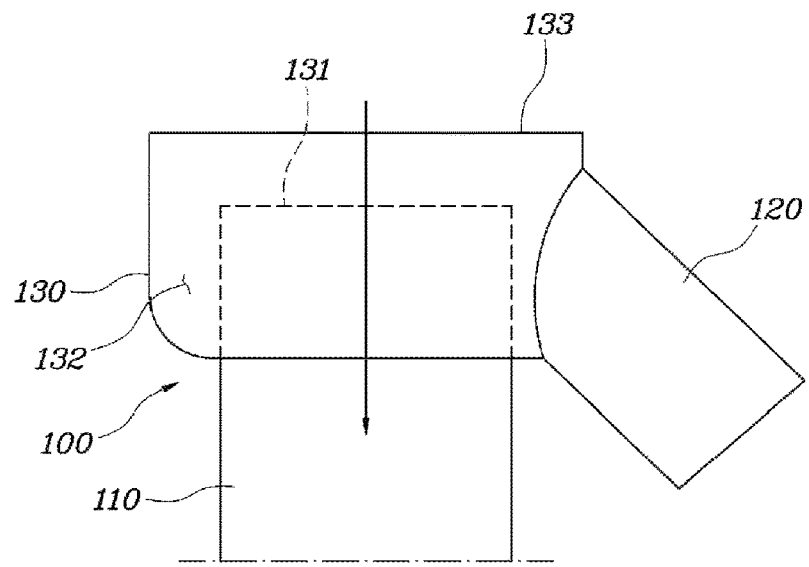
FIG. 8 is a view illustrating a fuel injection mode according to an exemplary embodiment of the present invention.

When it is required to inject fuel, as shown in FIG. 8, a user separates the first cap device 200 from the guide pipe 130. Accordingly, the fuel injection passage 110 is opened and fuel can be injected therein. When the first cap device 200 is separated from the guide pipe 130, as shown in FIG. 9, the block diaphragms 140 pushed by the first cap device 200 are turned by the elasticity of the springs 142 and contacts the fixing portion 131. Accordingly, the channel 132 is closed and only the fuel injection passage 110 is opened while the urea injection passage 120 closed.

Accordingly, when fuel is injected through the guide pipe 130, the fuel is injected into the fuel injection passage 110, so the fuel can be supplied into the fuel tank.

According to the dual cap assembly having multiple passages that has the structure described above, a fuel injection passage and a urea injection passage are unified and are opened or closed by a single cap assembly.

Accordingly, the fuel injection passage 110 and the urea injection passage 120 are connected to a shared injection port, so the disposition region is reduced, the design quality is improved, and the manufacturing cost is reduced.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual cap assembly having a plurality of passages, the cap assembly comprising:
   a pipe device having a plurality of separate passages;
   a first cap device detachably mounted at a position where the passages diverge in the pipe device to close a first passage; and
   a second cap device detachably mounted on the first cap device to close a second passage,
   wherein, when the first cap device is separated from the pipe device, the first passage is configured to be opened, and when the second cap device is separated with the first cap device mounted on the pipe device, the second passage is configured to be opened while the first passage is closed.

2. The cap assembly of claim 1, wherein the pipe device has a fuel injection passage for keeping fuel and a urea injection passage for keeping urea, and
   the cap assembly further includes a guide pipe disposed at an inlet of the fuel injection passage and connected to the urea injection passage, separating the fuel injection passage and the urea injection passage.

3. The cap assembly of claim 2, wherein the guide pipe has a fixing portion surrounding the inlet of the fuel injection passage, and a circumferential portion, which has an open side and is wider than the fixing portion, forms a channel with the fixing portion and is connected to the urea injection passage.

4. The cap assembly of claim 3, wherein within a guide portion, the circumferential portion extends to a greater height than the fixing portion.

5. The cap assembly of claim 3, wherein a block diaphragm is disposed on the circumferential portion and elastically turns toward the fixing portion to contact the fixing portion.

6. The cap assembly of claim 5, wherein a plurality of block diaphragms is disposed and separated from each other around an internal side of the circumferential portion, and the block diaphragms each have a first end portion rotatably disposed on the circumferential portion and a second end portion connected to a spring to be elastically supported inwardly.

7. The cap assembly of claim 6, wherein the block diaphragms are disposed such that first and second edge portions of adjacent block diaphragms overlap each other.

8. The cap assembly of claim 1, wherein the first cap device has a lower cap which is detachably mounted on the guide pipe and closes the fuel injection passage in contact with the inlet of the fuel injection passage when mounted on the guide pipe, and an upper cap that closes an open side of the guide pipe and has a mounting hole for mounting the second cap device.

9. The cap assembly of claim 8, wherein a coupling portion which is inserted into the inlet of the fuel injection passage is formed at the lower cap, and corresponding threads are formed on an external side of the coupling portion and an internal side of the inlet of the fuel injection passage.

10. The cap assembly of claim 8, wherein a thread is formed along a circumference of the mounting hole of the upper cap and the second cap device has a coupling portion which is thread-fastened to the mounting hole, and a grip is protrudingly formed and is formed across a center of the coupling portion.

11. The cap assembly of claim 10, wherein protrusive handles are formed on the upper cap at positions aligned straight with the grip of the second cap device, and
when the second cap device is thread-fastened to the mounting hole, the grip and the handles are disposed in a straight line, and when the second cap device is turned by 90° or more, the second cap device is unfastened.

12. The cap assembly of claim 8, wherein the lower cap is thread-fastened to the fuel injection passage and has first fixing steps protruding at predetermined intervals on a top portion thereof and having a slope, and
the upper cap is disposed on the lower cap and has first locking steps having a slope corresponding to the slope of the first fixing steps.

13. The cap assembly of claim 12, wherein first fixing extensions are elastically bent up and down and are formed at predetermined intervals on the lower cap, and the first fixing steps are formed at end portions of the first fixing extensions.

14. The cap assembly of claim 12, wherein the second cap device further includes:
an internal cap which is thread-fastened to the mounting hole of the upper cap and has second fixing steps protruding at predetermined intervals on a top portion thereof and having a slope; and
an external cap which is disposed over the internal cap and has a slope corresponding to the slope of the second fixing steps.

15. The cap assembly of claim 14, wherein threads for thread-fastening the lower cap of the first cap device and the fuel injection passage and threads for thread-fastening the internal cap of the second cap device and the upper cap are formed in opposite directions thereof.

16. The cap assembly of claim 14, wherein the slopes of the first fixing steps and the slopes of the second fixing steps are inclined in opposite directions, and the slopes of the first locking steps and the slopes of the second locking steps are formed in opposite directions thereof.

17. The cap assembly of claim 14, wherein inclination angles of the first fixing steps and the first locking steps are greater than inclination angles of the second fixing steps and the second locking steps.

18. The cap assembly of claim 8, wherein protrusive handles are formed around the mounting hole of the upper cap, and the handles have a fixing mechanism that slides in and out of and is inserted into a fixing groove formed at the guide pipe when the first cap device is fastened to the guide pipe so that the first cap device is maintained in the closed state.

19. The cap assembly of claim 18, wherein the fixing mechanism has a button elastically supported by a spring to move into and out of the handle, and a hook configured to be inserted into or separated out of the fixing groove when the button is moved in the handle.

20. The cap assembly of claim 19, wherein an end portion of the button which is in contact with the hook is inclined inwardly and outwardly, and the hook has a first end portion being in contact with the button and a second end portion bent to be inserted into the fixing groove.

21. The cap assembly of claim 8, wherein a guide pin configured to circumferentially rotate is internally disposed within the mounting hole of the upper cap,
a guide hole in which the guide pin is inserted is formed on an external side of the second cap device, and
the guide hole extends such that the guide pin is locked therein when the second cap device is inserted into the mounting hole of the first cap device, and the guide pin is separated when the second cap device is configured to be moved in an insertion direction thereof.

22. The cap assembly of claim 21, wherein the guide hole has a start point on a vertical line extending from a pivot point of the guide pin, a first bending point extending upward at an angle at a first side of the vertical line and then bending downward to a second side of the vertical line, a second bending point bending upward at the second side of the vertical line, and a third bending point bending downward thereof, having a heart shape.

23. The cap assembly of claim 22, wherein within the guide hole, a distance from the start point to the first bending point is a longest and a distance from the second bending point to the third bending point is a shortest.

24. The cap assembly of claim 22, wherein within the guide hole, only the first bending point is disposed at the first side of the vertical line, and the second bending point and the third bending point are disposed at the second side of the vertical line.

25. The cap assembly of claim 21, wherein a return plate elastically supported by a return spring is disposed in the mounting hole of the upper cap, so an elastic force that pushes the second cap device out of the mounting hole is applied to the second cap device.

26. The cap assembly of claim 8, wherein the first cap device is disposed such that the upper cap has a greater distance from the inlet of the fuel injection passage than the lower cap, and has bridges connecting the lower cap and the upper cap to each other.

* * * * *